(12) United States Patent
Hirao

(10) Patent No.: US 7,227,990 B2
(45) Date of Patent: Jun. 5, 2007

(54) COLOR IMAGE PROCESSING DEVICE AND COLOR IMAGE PROCESSING METHOD

(75) Inventor: Koichiro Hirao, Tokyo (JP)

(73) Assignee: NEC Corporation, Tokyo (JP)

( * ) Notice: Subject to any disclaimer, the term of this patent is extended or adjusted under 35 U.S.C. 154(b) by 505 days.

(21) Appl. No.: 10/066,671

(22) Filed: Feb. 6, 2002

(65) Prior Publication Data

US 2002/0114513 A1 Aug. 22, 2002

(30) Foreign Application Priority Data

Feb. 20, 2001 (JP) ............................. 2001-044143

(51) Int. Cl.
 G06K 9/00 (2006.01)
 G06K 9/40 (2006.01)
 G03F 3/08 (2006.01)
(52) U.S. Cl. ...................... 382/167; 382/163; 358/520
(58) Field of Classification Search ................ 382/167, 382/263; 358/518, 520
 See application file for complete search history.

(56) References Cited

U.S. PATENT DOCUMENTS 6,078,686 A * 6/2000 Kim ........................... 382/167
6,823,083 B1 * 11/2004 Watanabe et al. ........... 382/167

FOREIGN PATENT DOCUMENTS

| JP | 9-284560 | 10/1997 |
|---|---|---|
| JP | 10-42152 | 2/1998 |
| JP | 2906975 | 4/1999 |
| JP | 2000-175046 | 6/2000 |
| JP | 2000-175047 | 6/2000 |
| JP | 2000-278542 | 10/2000 |

* cited by examiner

Primary Examiner—Colin LaRose
(74) Attorney, Agent, or Firm—Sughrue Mion, PLLC

(57) ABSTRACT

The present invention provides a color image processing device and a color image processing method which is In order to perform natural and excellent sharpness processing to image data, the color image processing device of invention comprises: a color space converter (1) for converting image signals (RGB) to luminance signals (L), first chromaticity signals (C1) and second chromaticity signals (C2); a luminance signal correcting unit for correcting the luminance signal (L) of a target pixel based on an average luminance signal ($L_A$) obtained from the luminance signals of the target pixel and predetermined pixels surrounding the target pixel and the saturation signal (S) of the target pixel; a chromaticity signal correcting unit for correcting the first chromaticity signal (C1) and the second chromaticity signal (C2) of the target pixel based on the first and second average chromaticity signals ($C1_A$, $C2_A$) obtained from the chromaticity signals of the target pixel and the predetermined pixels surrounding the target pixel, the saturation signal (S) of the target pixel, the average saturation signal ($S_A$) obtained from the saturation signals of the target pixel and the predetermined pixels surrounding the target pixel, and a hue difference signal (DC); and a color space inverter (15) for inverting the corrected luminance signal (L'), the corrected first chromaticity signal (C1') and the corrected second chromaticity signal (C2') of the target pixel to image signals (R'G'B').

8 Claims, 5 Drawing Sheets

COLOR IMAGE PROCESSING DEVICE AND COLOR IMAGE PROCESSING METHOD

FIELD OF THE INVENTION

The present invention relates to a device and a method for color image processing. More particularly, the present invention relates to a color image processing device and a color image processing method for performing sharpness processing to image data.

BACKGROUND OF THE INVENTION

In order to perform sharpness processing to a color space represented by luminance and color components, such as a CIELAB color space, a CIELUV color space and a YCbCr color space, conventional image processing devices determine the correction value for the luminance component according to the saturation value of the pixel, and at the same time correct the color component. In this manner, problems such as color turbidity after the correction are solved.

As a conventional technique of an image processing device, Japanese Patent Laid-Open Application No. 2000-175046 (Related Art 1) discloses an image processing method and an image processing device for noise reduction and sharpness enhancement of a digital image.

The image processing device described in Related Art 1 is provided with a sharpness processor, a smoothing processor, an edge/noise-mixed component extractor, an edge detector, a noise region weighting factor operator, a noise component identifier and an output image operator.

The sharpness processor performs sharpness enhancement to the original image data to sharpen the image and the noise included in the image, thereby generating sharpness-enhanced image data. The smoothing processor smoothes the original image data to generate a smoothed image data. The edge/noise-mixed component extractor subtracts the smoothed image data from the sharpness-enhanced image data to generate an edge/noise-mixed object image data including both of the sharpness-enhanced edge of the object image and the sharpness-enhanced noise. The edge detector detects the edge of the original image data to obtain weighting data of the edge region for identifying the edge and noise regions of the object image. The noise region weighting factor operator obtains weighting data of the noise region from the obtained weighting data of the edge region. The noise component identifier multiplies the edge/noise-mixed object image data by the noise region weighting data to obtain noise data for each color in the noise region, calculates color correlation of the noise data for each color, obtain black-and-white noise components and color noise components present in all colors based on the obtained color correlation components and multiply both of the obtained black-and-white noise components and color noise components by their reduction factor, thereby obtaining a black-and-white noise reduction component and a color noise reduction component. The output image operator selectively removes the black-and-white noise reduction component and the color noise reduction component from the sharpness-enhanced image data to reduce the noise, thereby generating a processed image that retains sharpness enhancement in the image edge region.

Japanese Patent Laid-Open Application No. 2000-175047 (Related Art 2) discloses an image processing method and an image processing device for noise reduction and sharpness enhancement of a digital image.

The image processing device described in Related Art 2 is provided with a sharpness processor, a smoothing processor, an edge/granularity-mixed component extractor, an edge detector, a granularity region weighting factor operator, a granularity component identifier and an output image operator.

The sharpness processor performs sharpness enhancement to the original image data to sharpen the image as well as the granularity or the noise included in the image, thereby generating sharpness-enhanced image data. The smoothing processor performs smoothing process to the original image data to generate a smoothed image data. The edge/granularity-mixed component extractor subtracts the smoothed image data from the sharpness-enhanced image data to generate an edge/granularity-mixed object image data that includes both of the edge of the sharpness-enhanced object image and the sharpness-enhanced granularity. The edge detector detects the edge of the original image data to obtain weighting data of the edge region for identifying the object image edge region and the granularity region. The granularity region weighting factor operator obtains weighting data of the granularity region from the obtained weighting data of the edge region. The granularity component identifier multiplies the edge/granularity-mixed object image data by the granularity region weighting data to obtain granularity data for each color in the granularity region, calculates, based on the granularity data of each color, a local granularity factor indicating the spatial size and the magnitude of a change in density of the granularity, identify and separate black-and-white granularity components and pigment granularity components, and multiply both of the obtained black-and-white granularity component and the pigment granularity component by their reduction factor, thereby obtaining a black-and-white granularity reduction component and a pigment granularity reduction component. The output image operator selectively removes the black-and-white granularity reduction component and the pigment granularity reduction component from the sharpness-enhanced image data to reduce granularity, thereby generating a processed image that retains sharpness enhancement in the image edge region.

Japanese Patent Laid-Open Application No. 2000-278542 (Related Art 3) discloses an image processing device which is capable of natural edge enhancement between colors that have little difference in lightness and densities.

The image processing device described in Related Art 3 processes and outputs color image information input from a certain image input device. The image processing device is provided with a color difference information extracting means, a color difference edge detecting means, a color difference enhancement level calculating means and a color difference enhancement correcting means. The color difference information extracting means extracts color difference information from the color image information. The color difference edge detecting means detects a color difference edge from the color difference information extracted by the color difference information extracting means, thereby calculating the color difference edge value at the color difference edge. The color difference enhancement level calculating means calculates a color difference enhancement level based on the color difference edge value calculated by the color difference edge detecting means. The color difference enhancement correcting means performs enhancement correction to the color difference information based on the color difference enhancement level calculated by the color difference enhancement level calculating means.

Japanese Patent Laid-Open Application No. 9-284560 (Related Art 4) discloses a sharpness processing device which is capable of providing an excellently-sharpened printed matter at a low cost.

The sharpness processing device described in Related Art 4 performs sharpness processing to an input image signal. The device is provided with a storing means, a selecting means, a processing means and an outputting means. The storing means stores a plurality of values corresponding to a plurality of image display conditions as parameters for sharpness processing. The selecting means selects a particular value from the plurality of parameters according to a particular image display condition selected among the plurality of image display conditions. The processing means performs sharpness processing to the input image signal in accordance with the particular value. The outputting means outputs an output image signal resulting from the sharpness processing to an image displaying means that is appropriate for the particular image display condition. The sharpness processor described in Related Art 4 is characterized in that the plurality of parameters give substantially equal sharpness presentations for the plurality of image display conditions.

Japanese Patent Laid-Open Application No. 10-42152 (Related Art 5) discloses an image processing device and method in which a circuit configuration required for edge enhancement correction is simplified.

The image processor described in Related Art 5, which performs sharpness correction to an input image signal, is provided with an extracting means, an edge value extracting means, a saturation extracting means, a dividing means and an edge enhancement means. The extracting means extracts a lightness signal and a chromaticity signal from of the input image signal. The edge value extracting means extracts an edge value based on the lightness signal. The saturation extracting means extracts a saturation component based on the chromaticity signal. The dividing means divides the enhancement level of the edge portion, which is based on the edge value extracted by the edge value extracting means, for a lightness signal and a chromaticity signal according to the saturation component extracted by the saturation extracting means. The edge enhancement means corrects the lightness signal and the chromaticity signal by the enhancement levels of the edge portion divided by the dividing means.

From Japanese Patent No. 2906975 (Related Art 6), a color image processing method and device which can reduce an image noise caused by edge enhancement processing and which can perform visually natural edge enhancement are known.

The image processing device described in Related Art 6 is provided with an edge detecting means for obtaining an edge value signal from a luminance signal of a luminance/chromaticity-separated signal, an edge enhancement means for enhancing an edge portion in an image represented by the luminance signal, a smoothing means for smoothing the luminance signal, a saturation detecting means for detecting a saturation signal of the image based on the chromaticity signal of the luminance/chromaticity-separated signal, a means for converting luminance by mixing the output from the edge enhancement means and the output from the smoothing means based on the edge value signal detected by the edge detecting means, and means for converting chromaticity of the chromaticity signal corresponding to compression or expansion of saturation using the output from the edge detecting means and the output from the saturation detecting means.

In order to correct color components, conventional image processing devices perform sharpness processing to the color components by extracting and using an edge value based on the changing point (edge) of the lightness (characteristic) of the image through edge detection of the luminance component. In this case, sharpness processing cannot be performed in a satisfactory manner when values of the luminance components at an edge portion of a letter or a line are generally equal but values of the color components are entirely different. For example, when a yellow letter or a yellow line is on a white background, conventional image processing devices cannot sufficiently cope with the difference of any of luminance, saturation and hue components of the pixels in the color image since the luminance of white and yellow colors are generally equal.

SUMMARY OF THE INVENTION

The present invention has an objective of providing a color image processing device and a color image processing method which enable natural and excellent sharpness processing of image data.

Another objective of the present invention is to provide a color image processing device and a color image processing method which can sufficiently cope with difference of any of luminance, saturation and hue components of the pixels.

Means for achieving the above-described objectives will be described below. In the following descriptions that correspond to the appended claims, reference numerals and symbols are indicated within parentheses. The reference numerals and symbols correspond to those appearing in the description of at least one of a plurality of embodiments or examples of the invention, particularly those appearing in the appended drawings corresponding to the plurality of embodiments or examples of the invention. The reference numerals and symbols aid to clarify correspondence between the descriptions of the claims and the descriptions of the embodiments or examples of the present invention. Such correspondence, however, does not limit the description of the claims to the descriptions of the embodiment or the example.

A color image processing device of the invention comprises: a color space converter (1) for converting image signals (RGB) to luminance signals (L) corresponding to luminance and first and second chromaticity signals (C1, C2) corresponding to chromaticity; a luminance signal correcting unit for correcting the luminance signal (L) of a target pixel based on an average luminance signal ($L_A$) obtained from luminance signals of the target pixel and predetermined pixels surrounding the target pixel, and a saturation signal (S) corresponding to saturation of the target pixel; a chromaticity signal correcting unit for correcting the first and second chromaticity signals (C1, C2) of the target pixel based on first and second average chromaticity signals ($C1_A$, $C2_A$) obtained from the chromaticity signals of the target pixel and the predetermined pixels surrounding the target pixel, the saturation signal (S) of the target pixel, an average saturation signal ($S_A$) of the target pixel and the predetermined pixels surrounding the target pixel, and a hue difference signal (DC) representing color similarity which is obtained from the first and second chromaticity signals and the first and second average chromaticity signals; and a color space inverter (15) for inverting the corrected luminance signal (L'), the corrected first chromaticity signal (C1') and the corrected second chromaticity signal (C2') to image signals (R'G'B').

In a color image processing device of the invention, the luminance signal correcting unit comprises a luminance correcting factor calculator (11) for determining a luminance correcting level ($K_L$) for correcting the luminance signal (L) of the target pixel based on the average luminance signal ($L_A$) and the saturation signal (S) of the target pixel.

In a color image processing device of the invention, the luminance signal correcting unit comprises a luminance corrector (13) for correcting the luminance signal (L) of the target pixel based on the luminance correcting level ($K_L$).

The color image processing device of the invention may further comprise: a saturation calculator (8) for generating a saturation signal (S) of the target pixel based on the first and second chromaticity signals (C1, C2); an average saturation calculator (9) for generating the average saturation signal ($S_A$) based on the first and second average chromaticity signals ($C1_A$, $C2_A$); and a hue difference calculator (10) for generating the hue difference signal (DC) based on the first and second chromaticity signals (C1, C2) as well as the first and second average chromaticity signals ($C1_A$, $C2_A$) In a color image processing device of the invention, the chromaticity signal correcting unit comprises a color correcting factor calculator (12) for determining the chromaticity correcting level ($K_C$) for correcting the first and second chromaticity signals (C1, C2) of the target pixel based on the saturation signal (S) of the target pixel, the average saturation signal ($S_A$) and the hue difference signal (DC).

In a color image processing device of the invention, chromaticity signal correcting unit comprises a chromaticity corrector (14) for correcting the first and second chromaticity signals (C1, C2) based on the chromaticity correcting level ($K_C$).

Accordingly, the present invention is capable of performing natural and excellent sharpness processing to a color image regardless of a monochrome gray region or a color region in the image.

A color image processing device of the invention comprises: a color space converter (101) for converting image signals (RGB) to lightness signals (V) corresponding to lightness, saturation signals (S) corresponding to saturation and hue signals (H) corresponding to hue; a lightness signal correcting unit for correcting the lightness signal (V) of a target pixel based on an average lightness signal ($V_A$) obtained from the lightness signals of the target pixel and predetermined pixels surrounding the target pixel, and the saturation signal (S); a saturation signal correcting unit for correcting the saturation signal (S) of the target pixel based on an average saturation signal ($S_A$) obtained from the saturation signals of the target pixel and the predetermined pixels surrounding the target pixel, and an average hue signal ($H_A$) obtained from the hue signals of the target pixel and the predetermined pixels surrounding the target pixel; and a color space inverter (112) for inverting the corrected lightness signal (V'), the corrected saturation signal (S') and the hue signal (H') to image signals (R'G'B').

In the color image processing device of the invention, the lightness signal correcting unit comprises a lightness correcting factor calculator (108) for determining a lightness correcting level ($K_V$) for correcting the lightness signal (V) of the target pixel based on the average lightness signal ($V_A$) and the saturation signal (S).

In the color image processing device of the invention, the lightness signal correcting unit comprises a lightness corrector (110) for correcting the lightness signal (V) of the target pixel based on the lightness correcting level ($K_V$).

In the color image processing device of the invention, the saturation signal correcting unit comprises a saturation correcting factor calculator (109) for determining a saturation correcting level ($K_S$) for correcting the saturation signal (S) of the target pixel based on the average saturation signal ($S_A$) and the average hue signal ($H_A$).

In the color image processing device of the invention, the saturation signal correcting unit comprises a saturation corrector (111) for correcting the saturation signal (S) of the target pixel based on the saturation correcting level ($K_S$).

Accordingly, the present invention is capable of performing natural and excellent sharpness processing to a color image regardless of a monochrome gray region or a color region in the image.

A color image processing method of the invention comprises the steps of: (a) converting image signals (RGB) to luminance signals (L) corresponding to luminance, and first and second chromaticity signals (C1, C2) corresponding to chromaticity; (b) correcting the luminance signal (L) of a target pixel based on an average luminance signal ($L_A$) obtained from the luminance signals of the target pixel and predetermined pixels surrounding the target pixel, and a saturation signal (S) corresponding to saturation of the target pixel; (c) correcting the first and second chromaticity signals (C1, C2) of the target pixel based on first and second average chromaticity signals ($C1_A$, $C2_A$) obtained from the chromaticity signals of the target pixel and the predetermined pixels surrounding the target pixel, the saturation signal (S) of the target pixel, the average saturation signal ($S_A$), and a hue difference signal (DC) representing color similarity obtained from the first and second chromaticity signals and the first and second average chromaticity signals; and (d) inverting the corrected luminance signal (L'), the corrected first chromaticity signal (C1') and the corrected second chromaticity signal (C2') to image signals (R'G'B').

In the color image processing method of the invention, the step of (b) for correcting the luminance signal further comprises the steps of: (e) determining the luminance correcting level ($K_L$) for correcting the luminance signal (L) of the target pixel based on the average luminance signal ($L_A$) and the saturation signal (S) of the target pixel; and (f) correcting the luminance signal (L) based on the luminance correcting level ($K_L$).

In the color image processing method of the invention, the step of (c) for correcting the chromaticity signals further comprises the steps of: (g) generating the saturation signal (S) of the target pixel based on the first and second chromaticity signals (C1, C2); (h) generating the average saturation signal ($S_A$) based on the first and second average chromaticity signals ($C1_A$, $C2_A$); and (i) generating the hue difference signal (DC) based on the first and second chromaticity signals (C1, C2) as well as first and second average chromaticity signals ($C1_A$, $C2_A$).

In the color image processing method of the invention, the step of (c) for correcting the chromaticity signals further comprises the steps of: (j) determining a chromaticity correcting level ($K_C$) for correcting the first and second chromaticity signals (C1, C2) of the target pixel based on the saturation signal (S) of the target pixel, the average saturation signal ($S_A$) and the hue difference signal (DC); and (k) correcting the first and second chromaticity signals (C1, C2) of the target pixel based on the chromaticity correcting level ($K_C$).

Accordingly, the present invention is capable of performing natural and excellent sharpness processing to a part of an image where enhancement would not take place according to the difference of luminance.

A color image processing method of the invention comprises the steps of: (a) converting image signals (RGB) to lightness signals (V) corresponding to lightness, saturation signals (S) corresponding to saturation and hue signals (H) corresponding to hue; (b) correcting the lightness signal (V) of a target pixel based on an average lightness signal ($V_A$) obtained from the lightness signals of the first target pixel and pixels surrounding the first target pixel, and the saturation signal (S); (c) correcting the saturation signal (S) of the target pixel based on an average saturation signal ($S_A$) obtained from the saturation signals of the target pixel and the predetermined pixels surrounding the target pixel, and an average hue signal ($H_A$) obtained from the hue signals of the target pixel and the predetermined pixels surrounding the target pixel; and (d) inverting the corrected lightness signal (V'), the corrected saturation signal (S') and the hue signal (H) to image signals (R'G'B').

In a color image processing method of the invention, the step of (b) for correcting the lightness signal further comprises the steps of: (e) determining a lightness correcting level ($K_V$) for correcting the lightness signal (V) of the target pixel based on the average lightness signal ($V_A$) and the saturation signal (S); and (f) correcting the lightness signal (V) of the target pixel based on the lightness correcting level ($K_V$).

In a color image processing method of the invention, the step of (c) for correcting the saturation signal further comprises the steps of: (g) determining a saturation correcting level ($K_S$) for correcting the saturation signal (S) of the target pixel based on the average saturation signal ($S_A$) and the average hue signal ($H_A$); and (h) correcting the saturation signal (S) of the target pixel based on the saturation correcting level ($K_S$).

Accordingly, natural and effective sharpness processing can be performed even to a part of the image that would not be enhanced according to the difference of the luminance.

PREFFERED EMBODIMENT OF THE INVENTION

Hereinafter, embodiments of a color image processing device of the present invention will be described with reference to the accompanying drawings.

Embodiment 1

Figure 1:
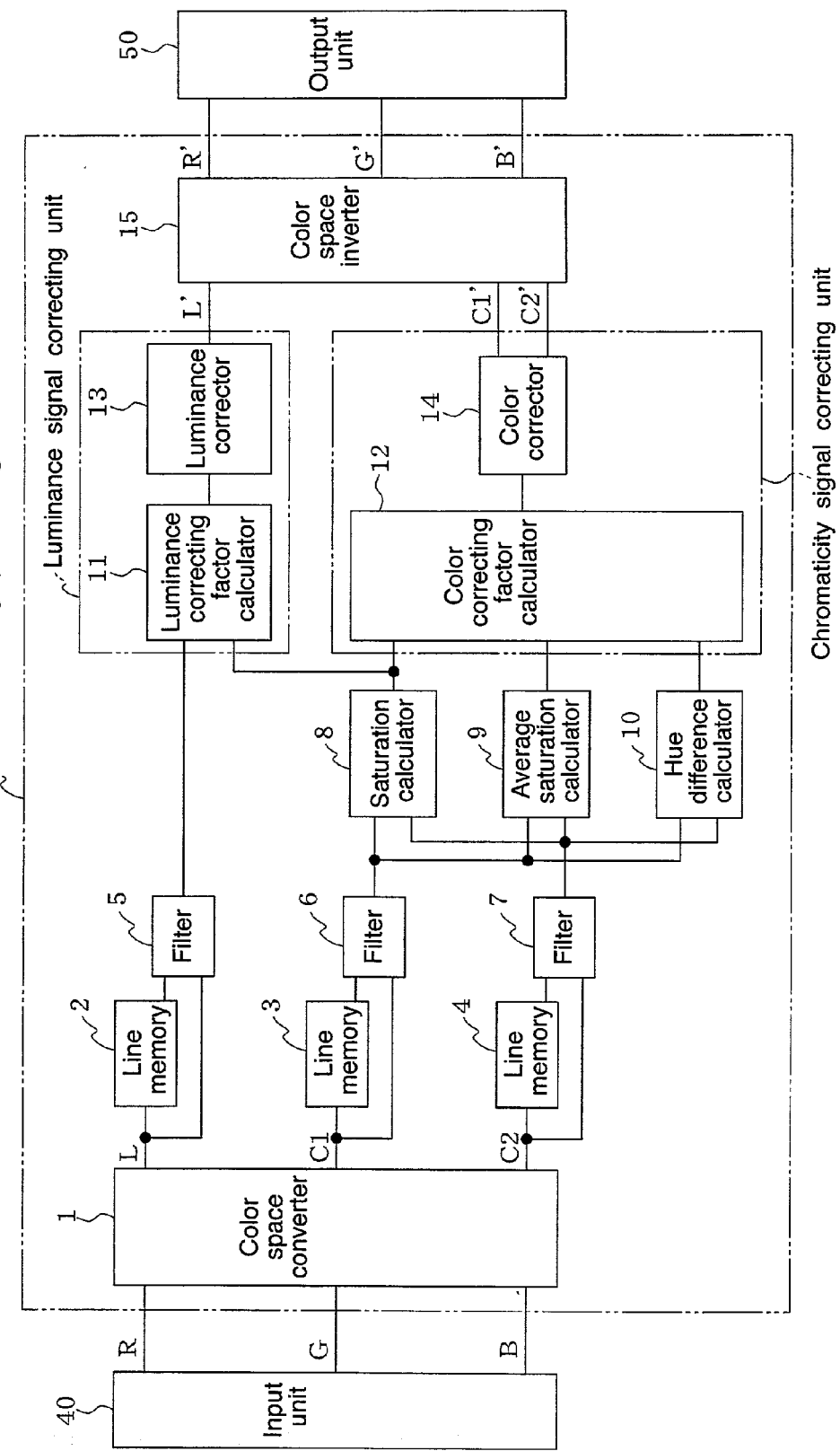
FIG. 1 is a block diagram showing a configuration of a color image processing device according to Embodiment 1 of the invention.

FIG. 1 is a block diagram showing a configuration of a color image processing device 30 according to Embodiment 1 of the present invention.

Referring to FIG. 1, the color image processing device 30 of Embodiment 1 is provided with a color space converter 1, line memories 2 to 4, filters 5 to 7, a saturation calculator 8, an average saturation calculator 9, a hue difference calculator 10, a luminance correcting factor calculator 11, a color correcting factor calculator 12, a luminance corrector 13, a color corrector 14 and a color space inverter 15. Furthermore, the color image processing device 30 is connected to peripherals such as an input unit 40 including a scanner and the like, and an output unit 50 including a display unit, a printer and the like.

The input unit 40 scans RGB color image signals (RGB signals) in the x-direction (main-scanning direction) and inputs signals of each line by each element of a color space. Here, one line refers to a line of adjacent pixels (including target pixel) scanned in the main-scanning direction. The input unit 40 outputs the input RGB signals for each element of the color space to the color space converter 1. Then, the input unit 40 scans in the y-direction (sub-scanning direction) and scans the RGB color image signals (RGB signals) in the main-scanning direction to input signals of the next line by each element of the color space. The input RGB signals for each element of the color space are output to the color space converter 1.

The color space converter 1 converts the RGB signals input from the input unit 40 into elements of color space represented by luminance signals L corresponding to a luminous intensity of light from a light source per orthogonal unit area, and chromaticity signals C1 and C2 representing degrees of color. Herein, the luminance signals L and the chromaticity signals C1 and C2 represent a color space such as a CIELAB color space, a CIELUV color space and a YCbCr color space, and are converted using computing or a table. The color space converter 1 outputs the converted luminance signals L to the line memory 2 and the filter 5, the converted chromaticity signals C1 to the line memory 3 and the filter 6, and the converted chromaticity signals C2 to the line memory 4 and the filter 7.

The sizes of the line memories 2 to 4 depend on the sizes of the filters 5 to 7. When a filter has a size for M×M adjacent pixels (where M is an integer), the line memory needs to have a size for at least (M−1) lines. When the line memories each have a size for (M−1) lines, the line memory 2 can store luminance signals L for (M−1) lines given from the color space converter 1, the line memory 3 can store chromaticity signals C1 for (M−1) lines given from the color space converter 1, and the line memory 4 can store chromaticity signals C2 for (M−1) lines given from the color space converter 1.

The filters 5 to 7 read out the signals (luminance signals L and chromaticity signals C1 and C2) that are converted into a color space for a line that is (M−1) lines before the present line to the immediately preceding line from the line memories 2 to 4, respectively, and read out the signals for the present line from the color space converter 1. The filters 5 to 7 use the read-out signals (luminance signals L and chromaticity signals C1 and C2) that are converted into the color space to calculate average values of L, C1 and C2 based on L, C1 and C2 values (edge values) of the target pixel and pixels surrounding the target pixel.

Hereinafter, the above-mentioned filters 5 to 7 will be described in more detail with reference to FIG. 2.

Figure 2:
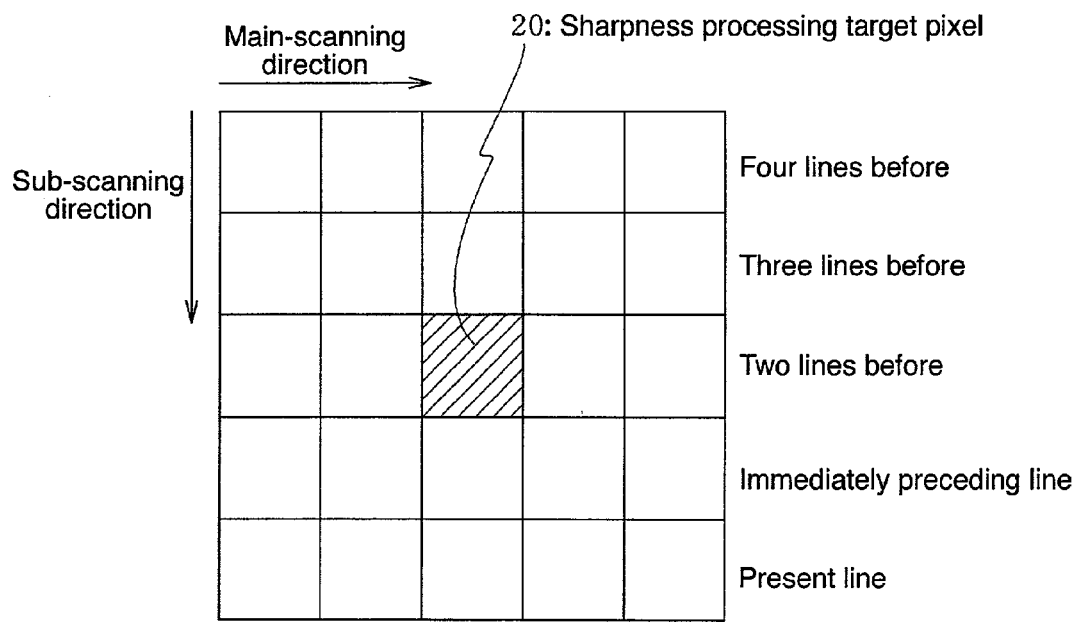
FIG. 2 is a plan view showing a size of a filter used in the color image processing device of Embodiment 1.

FIG. 2 is a plan view showing a size of the filters used in the color image processing device of Embodiment 1.

For example, the filter size of the filters 5 to 7 may be adaptive for 5×5 adjacent pixels as shown in FIG. 2.

According to this example, the filter 5 has a pixel 20 at the center. The filter 5 reads out the luminance signals L for the line that is four lines before the present line to the immediately preceding line from the line memory 2 and reads out the luminance signals L for the present line from the color space converter 1. Herein, the center pixel 20 is referred to as a "sharpness processing target pixel" or a "target pixel". The filter 5 calculates an average value of the values (luminance edge values) indicated by the luminance signals L of the 25 pixels including the target pixel to generate an average luminance signal $L_A$. The filter 5 outputs the luminance signal L of the target pixel and the calculated average luminance signal $L_A$ to the luminance correcting factor calculator 11.

According to this example, the filter 6 has the pixel 20 at the center. The filter 6 reads out the chromaticity signals C1 for the line that is four lines before the present line to the immediately preceding line from the line memory 3 and reads out the chromaticity signals C1 for the present line from the color space converter 1. Herein, the center pixel 20 is referred to as a "sharpness processing target pixel" or a "target pixel". The filter 6 calculates an average value of the values (color edge values) indicated by the chromaticity signals C1 of the 25 pixels including the target pixel to generate an average chromaticity signal $C1_A$. The filter 6 outputs the chromaticity signal C1 of the target pixel to the saturation calculator 8 and the hue difference calculator 10, and the calculated average chromaticity signal $C1_A$ to the average saturation calculator 9 and the hue difference calculator 10.

According to this example, the filter 7 has the pixel 20 at the center. The filter 7 reads out the chromaticity signals C2 for the line that is four lines before the present line to the immediately preceding line from the line memory 4 as well as the chromaticity signals C2 for the present line from the color space converter 1. Herein, the center pixel 20 is referred to as a "sharpness processing target pixel" or a "target pixel". The filter 7 calculates an average value of the values (color edge values) indicated by the chromaticity signals C2 of the 25 pixels including the target pixel to generate an average chromaticity signal $C2_A$. The filter 7 outputs the chromaticity signal C2 of the target pixel to the saturation calculator 8 and the hue difference calculator 10, and the calculated average chromaticity signal $C2_A$ to the average saturation calculator 9 and the hue difference calculator 10.

In the above-described example shown in FIG. 2, the filters 5 to 7 calculate the average values based on the 5×5 adjacent pixels including the target pixel. Alternatively, the filters 5 to 7 can also calculate the average values based on the 5×5 adjacent pixels without the target pixel. The filter sizes of the filters 5 to 7 are not necessarily equal. For example, the filter sizes may differ between the luminance component filter and the color component filters.

As shown in FIG. 1, the chromaticity signal C1 of the target pixel from filter 6 and the chromaticity signal C2 of the target pixel from filter 7 are input to the saturation calculator 8. The saturation calculator 8 obtains (calculates) saturation S representing the vividness of the color based on the values (color edge values) indicated by the chromaticity signals C1 and C2, thereby generating a saturation signal S. The saturation calculator 8 calculates saturation based on the chromaticity signals C1 and C2 of the target pixel according to the following Equation (1). Alternatively, the saturation calculator 8 may also calculate saturation S by the following simplified equations (2) or (3).

$$S=(C1^2+C2^2)^{1/2} \quad (1)$$

$$S=C1^2+C2^2 \quad (2)$$

$$S=\max(C1, C2) \quad (3)$$

In the above equations, saturation S is calculated using computing or a table. The saturation calculator 8 outputs the saturation signal S (calculated saturation S) to the luminance correcting factor calculator 11 and outputs the saturation signal S (calculated saturation S) as well as the chromaticity signals C1 and C2 of the target pixel to the color correcting factor calculator 12.

The average chromaticity signal $C1_A$ from the filter 6 and the average chromaticity signal $C2_A$ from the filter 7 are input to the average saturation calculator 9. The average saturation calculator 9 obtains (calculates) average saturation $S_A$ representing the average vividness of the colors based on the values (mean color edge values) indicated by the average chromaticity signals $C1_A$ and $C2_A$, thereby generating an average saturation signal $S_A$. The average saturation calculator 9 calculates average saturation $S_A$ according to the following Equation (4) based on the average chromaticity signals $C1_A$ and $C2_A$. Alternatively, the average saturation calculator 9 may also calculate average saturation $S_A$ by the following simplified equations (5) or (6).

$$S_A=(C1_A^2+C2_A^2)^{1/2} \quad (4)$$

$$S_A=C1_A^2+C2_A^2 \quad (5)$$

$$S_A=\max(C1_A, C2_A) \quad (6)$$

In the above equations, the average saturation $S_A$ is calculated using computing or a table corresponding to the computing system of the saturation calculator 8. The average saturation calculator 9 outputs the average saturation signal $S_A$ (calculated average saturation $S_A$) to the color correcting factor calculator 12.

The chromaticity signal C1 of the target pixel and the average chromaticity signal $C1_A$ from the filter 6 as well as the chromaticity signal C2 of the target pixel and the average chromaticity signal $C2_A$ from the filter 7 are input to the hue difference calculator 10. The hue difference calculator 10 obtains (calculates) hue difference indicating color similarity based on the values (color edge values) indicated by the chromaticity signals C1 and C2 and the values (mean color edge values) indicated by the average chromaticity signals $C1_A$ and $C2_A$, thereby generating a hue difference signal DC.

Hereinafter, the above-described hue difference calculator 10 will be described in more detail with reference to FIG. 3.

Figure 3:
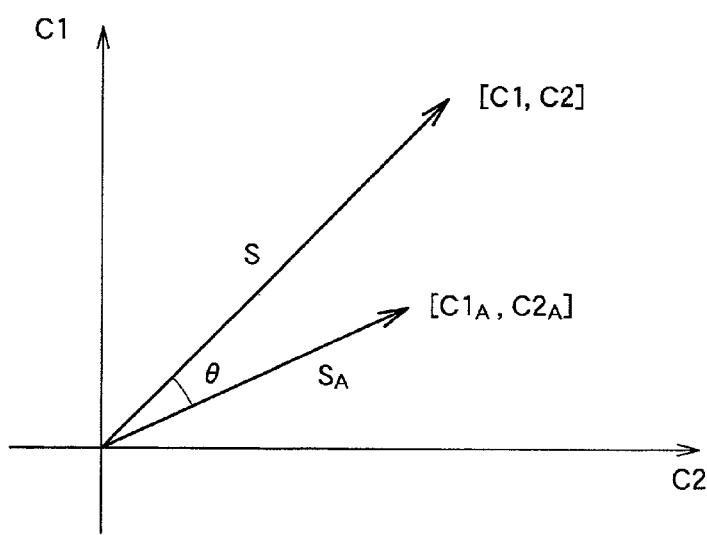
FIG. 3 is a diagram showing relationship between values indicated by color component data C1 and values indicated by color component data C2.

FIG. 3 is a diagram showing the relationship between values indicated by the chromaticity signals C1 and values indicated by the chromaticity signals C2.

For example, as shown in FIG. 3 where a predetermined reference value (e.g., color edge value of 0) indicated by the chromaticity signals C1 and C2 are set as the base point, a vector (C1, C2) is generated based on the values indicated by the chromaticity signals C1 and C2 of the target pixel. In addition, a vector ($C1_A$, $C2_A$) is generated based on the values indicated by the average chromaticity signals $C1_A$ and $C2_A$. The hue difference signal DC is cosine θ where θ is an angle between the vector (C1, C2) and the vector ($C1_A$, $C2_A$) on the two-dimensional plane produced by two color components.

The hue difference calculator 10 gives hue difference DC based on the values indicated by the chromaticity signals C1 and C2 and the values indicated by the average chromaticity signals $C1_A$ and $C2_A$ according to the following equation (7). Alternatively, the hue difference calculator 10 may give the hue difference DC according to the following simplified equation (8).

$$DC = \cos\theta = (C1 \times C1_A + C2 \times C2_A)/((C1^2 + C2^2)^{1/2} \times (C1_A^2 + C2_A^2)^{1/2}) \quad (7)$$

$$DC = \max(|C1 - C1_A|, |C2 - C2_A|) \quad (8)$$

Where hue difference $DC = \cos\theta$, $-1 \leq DC \leq 1$. DC is 1 when the colors are the same, and a higher DC value indicates higher similarity between the colors. For Equation (8), a lower DC value indicates higher similarity. The hue difference calculator 10 outputs the hue difference signal DC (calculated hue difference DC) to the color correcting factor calculator 12.

As shown in FIG. 1, the luminance signal L of the target pixel and the average luminance signal $L_A$ from the filter 5 as well as the saturation signal S from the saturation calculator 8 are input to the luminance correcting factor calculator 11. The luminance correcting factor calculator 11 obtains (calculates) a luminance sharpness correcting factor $K_L$ (a luminance sharpness correcting factor signal $K_L$) for the luminance corrector 13 to perform sharpness correction, based on a value (luminance edge value) indicated by the luminance signal L of the target pixel, a value (mean luminance edge value) indicated by the average luminance signal $L_A$ and the saturation signal S. Enhancement according to the luminance component is more effective in a monochrome gray region than in a color region. Enhancement in a color region may cause color turbidity or the like, resulting in image deterioration. Accordingly, the luminance sharpness correcting factor is calculated only when the saturation signal S of the sharpness processing target pixel (target pixel) is lower than the luminance correction threshold. The enhancement level of the luminance components of the entire color image is indicated as $K_{AL}$. The luminance correcting factor calculator 11 calculates a luminance sharpness correcting factor $K_L$ according to the following equation (9), based on the value indicated by the luminance signal L of the target pixel, the value indicated by the average luminance signal $L_A$ and the saturation signal S.

$$K_L = K_{AL} \times (L - L_A) \quad (9)$$

The luminance correcting factor calculator 11 outputs the luminance signal L of the target pixel and the luminance sharpness correcting factor signal $K_L$ (calculated luminance sharpness correcting factor $K_L$) to the luminance corrector 13.

The luminance signal L of the target pixel and the luminance sharpness correcting factor signal $K_L$ from the luminance correcting factor calculator 11 are input to the luminance corrector 13. In order to perform sharpness correction to the luminance signal L of the target pixel, the luminance corrector 13 obtains (calculates/generates) a sharpness-corrected luminance signal L' of the target pixel based on the value (luminance edge value) indicated by the luminance signal L of the target pixel and the luminance sharpness correcting factor signal $K_L$. The luminance corrector 13 calculates the luminance signal L' according to the following equation (10) based on the value indicated by the luminance signal L of the target pixel and the luminance sharpness correcting factor signal $K_L$.

$$L' = L + K_L \quad (10)$$

The luminance corrector 13 outputs the calculated luminance signal L' of the target pixel to the color space inverter 15.

The chromaticity signals C1 and C2 and the saturation signal S of the target pixel from the saturation calculator 8, the average saturation signal $S_A$ from the average saturation calculator 9, and the hue difference signal DC from the hue difference calculator 10 are input to the color correcting factor calculator 12. The chromaticity signals C1 and C2 of the target pixel are used for the later-described color corrector 14 to perform sharpness correction. The color correcting factor calculator 12 obtains (calculates) a color sharpness correcting factor $K_C$ (a color sharpness correcting factor signal $K_C$) for the color corrector 14 to perform sharpness correction based on the saturation signal S of the target pixel, the average saturation signal $S_A$, and the hue difference signal DC. When correction according to color components takes place in the monochrome gray region, color may be caused in the monochrome area. Accordingly, color sharpness is performed only when the saturation signal S of the sharpness processing target pixel (target pixel) is greater than the color correction threshold. The saturation signal S and the average saturation signal $S_A$ of pixels may be generally equal while the hue difference signal DC is high, in order words, the pixels may greatly differ in colors. In this case, the color sharpness correcting factor $K_C$ is calculated in a different manner according to the magnitude of the hue difference signal DC.

Specifically, when the hue difference signal DC is calculated by Equation (7) ($DC = \cos\theta$) and the hue difference signal DC is smaller than the hue difference threshold (when the colors are similar), the color correcting factor calculator 12 calculates a color sharpness correcting factor $K_C$ according to the following equation (11), based on the saturation signal S, the average saturation signal $S_A$ and the hue difference signal DC, where the enhancement level of the color components in the entire color image is represented by $K_{AS}$.

$$K_C = 1 + K_{AS} \times (S \times S_A) \quad (11)$$

When the hue difference signal DC is greater than the hue difference threshold (i.e., when the colors are different), the color correcting factor calculator 12 calculates a color sharpness correcting factor $K_C$ according to the following equation (12) (although there are other various calculations) based on the saturation signal S, the average saturation signal $S_A$ and the hue difference signal DC, where enhancement level of the color components differing in colors in the entire color image is represented by $K_{AC}$.

$$K_C = 1 + K_{AC} \times (S - S_A) \quad (12)$$

When the colors are different, a table may be produced based on the hue difference signal DC and the saturation difference $(S - S_A)$ to calculate $K_C$. In either case, the color sharpness correcting factor is calculated considering the hue difference signal DC and the saturation difference. The color correcting factor calculator 12 outputs the color sharpness correcting factor signal $K_C$ (the calculated color sharpness correcting factor $K_C$) and the chromaticity signals C1 and C2 of the target pixel to the color corrector 14.

The chromaticity signals C1 and C2 of the target pixel and the color sharpness correcting factor signal $K_C$ from the color correcting factor calculator 12 is input to the color corrector 14. In order to perform sharpness correction to the chromaticity signals C1 and C2 of the target pixel, the color corrector 14 obtains (calculates/generates) sharpness-corrected chromaticity signals C1' and C2' of the target pixel based on values (color edge values) indicated by the chromaticity signals C1 and C2 of the target pixel and the color sharpness correcting factor signal $K_C$. The color corrector 14 calculates the chromaticity signals C1' and C2' according to the following equations (13) and (14) based on the values indicated by the chromaticity signals C1 and C2 of the target pixel and the color sharpness correcting factor signal $K_C$.

$$C1'=C1 \times K_C \quad (13)$$

$$C2'=C2 \times K_C \quad (14)$$

The color corrector 14 outputs the calculated chromaticity signals C1' and C2' of the target pixel to the color space inverter 15.

The luminance signal L' of the target pixel from the luminance corrector 13 and the chromaticity signals C1' and C2' of the target pixel from the color corrector 14 are input to the color space inverter 15. The color space inverter 15 inverts the color space represented by the luminance signal L' and the chromaticity signals C1' and C2' of the target pixel into luminance- and color-corrected RGB (R'G'B') signals based on the luminance signal L' and the chromaticity signals C1' and C2' of the target pixel. The color space inverter 15 outputs the converted RGB (R'G'B') signals to the output unit 50.

The output unit 50 displays or prints out the converted RGB (R'G'B') signals.

Accordingly, the color image processing device 30 is able to perform natural and excellent sharpness processing to image signals regardless of the monochrome gray region or the color region of the image.

Hereinafter, operations performed by the above-described color image processing device 30 will be described with reference to FIG. 4.

Figure 4:
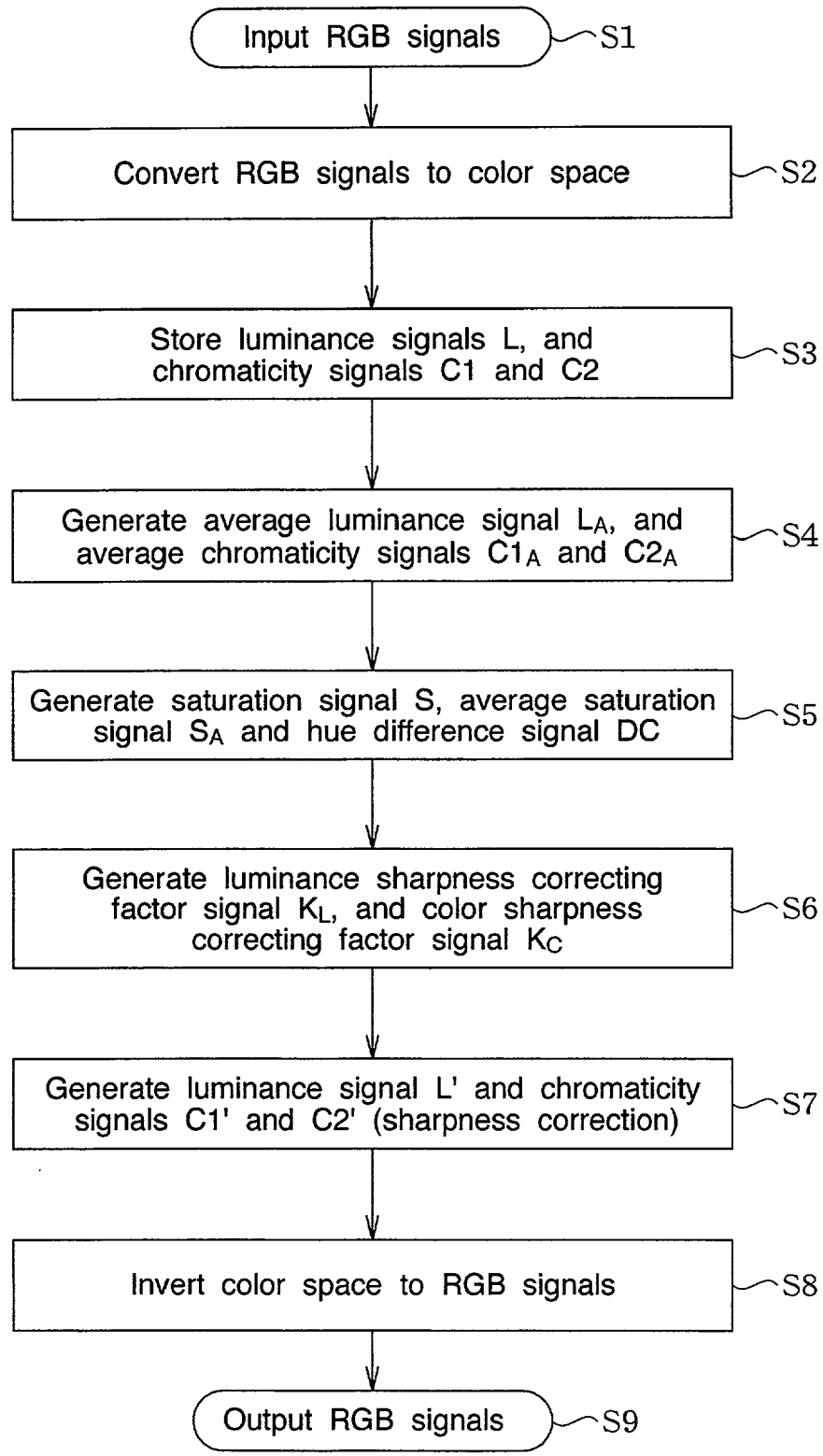
FIG. 4 is a flowchart showing a series of operations performed by the color image processing device of Embodiment 1.

FIG. 4 is a flowchart showing a series of operations performed by the color image processing device according to Embodiment 1.

Referring to FIG. 4, RGB signals are input from the input unit 40 to the color space converter 1 (Step S1).

The color space converter 1 converts the RGB signals input from the input unit 40 into a color space represented by luminance signals L and chromaticity signals C1 and C2 (Step S2). The color space converter 1 outputs the converted luminance signals L to the line memory 2 and the filter 5, the converted chromaticity signals C1 to the line memory 3 and the filter 6, and the converted chromaticity signals C2 to the line memory 4 and the filter 7.

Thus, the line memories 2 to 4 store the luminance signals L, the chromaticity signals C1 and the chromaticity signals C2 from the color space converter 1, respectively (Step S3).

Next, for M×M (where M is an integer) adjacent pixels with a target pixel at the center, the filter 5 reads out the luminance signals L for the line that is (M−1) lines before the present line to the immediately preceding line from the line memory 2 as well as the luminance signals L for the present line from the color space converter 1, thereby generating an average luminance signal $L_A$ from the values (luminance edge values) indicated by the luminance signals L of the M×M pixels including the target pixel (Step S4). The filter 5 outputs the luminance signal L of the target pixel and the generated average luminance signal $L_A$ to the luminance correcting factor calculator 11.

In Step S4, for M×M (where M is an integer) adjacent pixels with a target pixel at the center, the filter 6 reads out the chromaticity signals C1 for the line that is (M−1) lines before the present line to the immediately preceding line from the line memory 3 as well as the chromaticity signals C1 for the present line from the color space converter 1, thereby generating an average chromaticity signal $C1_A$ based on the values (color edge values) indicated by the chromaticity signals C1 of the M×M pixels including the target pixel. The filter 6 outputs the chromaticity signal C1 of the target pixel to the saturation calculator 8 and the hue difference calculator 10, and the generated average chromaticity signal $C1_A$ to the average saturation calculator 9 and the hue difference calculator 10.

In Step S4, for M×M (where M is an integer) adjacent pixels with a target pixel at the center, the filter 7 reads out the chromaticity signals C2 for the line that is (M−1) lines before the present line to the immediately preceding line from the line memory 4 as well as the chromaticity signals C2 for the present line from the color space converter 1, thereby generating an average chromaticity signal $C2_A$ based on the values (color edge values) indicated by the chromaticity signals C2 of the M×M pixels including the target pixel. The filter 7 outputs the chromaticity signal C2 of the target pixel to the saturation calculator 8 and the hue difference calculator 10, and the generated average chromaticity signal $C2_A$ to the average saturation calculator 9 and the hue difference calculator 10.

Next, with the chromaticity signals C1 and C2 of the target pixel from the respective filters 6 and 7, the saturation calculator 8 generates a saturation signal S based on values (color edge values) indicated by the chromaticity signals C1 and C2 of the target pixel (Step S5). The saturation calculator 8 outputs the generated saturation signal S to the luminance correcting factor calculator 11, and outputs the generated saturation signal S and the chromaticity signals C1 and C2 of the target pixel to the color correcting factor calculator 12.

In Step-S5, with the average chromaticity signals $C1_A$ and $C2_A$ from the respective filters 6 and 7, the average saturation calculator 9 generates an average saturation signal $S_A$ based on the values (mean color edge values) indicated by the average chromaticity signals $C1_A$ and $C2_A$. The average saturation calculator 9 outputs the generated average saturation signal $S_A$ to the color correcting factor calculator 12.

In Step S5, with the chromaticity signal C1 of the target pixel and the average chromaticity signal $C1_A$ from the filter 6 as well as the chromaticity signal C2 of the target pixel and the average chromaticity signal $C2_A$ from the filter 7, the hue difference calculator 10 generates a hue difference signal DC based on the values (color edge values) indicated by the chromaticity signals C1 and C2 and values (mean color edge values) indicated by the average chromaticity signals $C1_A$ and $C2_A$. The hue difference calculator 10 outputs the generated hue difference signal DC to the color correcting factor calculator 12.

Next, with the luminance signal L of the target pixel and the average luminance signal $L_A$ from the filter 5 as well as the saturation signal S from the saturation calculator 8, the luminance correcting factor calculator 11 generates a luminance sharpness correcting factor signal $K_L$ based on the value (luminance edge value) indicated by the luminance signal L of the target pixel and the value (mean luminance edge value) indicated by the average luminance signal $L_A$ and the saturation signal (Step S6). The luminance correcting factor calculator 11 outputs the luminance signal L of the target pixel and the generated luminance sharpness correcting factor signal $K_L$ to the luminance corrector 13.

In Step S6, with the chromaticity signals C1 and C2 of the target pixel from the saturation calculator 8, the average saturation signal $S_A$ from the average saturation signal calculator 9 as well as the hue difference signal DC from the hue difference calculator 10, the color correcting factor calculator 12 generates a color sharpness correcting factor signal $K_C$ based on the saturation signal S of the target pixel, the average saturation signal $S_A$ and the hue difference signal DC. The color correcting factor calculator 12 outputs the generated color sharpness correcting factor signal $K_C$ and the chromaticity signals C1 and C2 of the target pixel to the color corrector 14.

Next, in order to perform sharpness correction to the luminance signal L of the target pixel, with the luminance signal L of the target pixel and the luminance sharpness correcting factor signal $K_L$ from the luminance correcting factor calculator 11, the luminance corrector 13 generates a sharpness-processed luminance signal L' of the target pixel based on the value (luminance edge value) indicated by the luminance signal L of the target pixel and the luminance sharpness correcting factor signal $K_L$ (Step S7) The luminance corrector 13 outputs the generated luminance signal L' of the target pixel to the color space inverter 15.

In Step S7, in order to perform sharpness correction to the chromaticity signals C1 and C2 of the target pixel, with the chromaticity signals C1 and C2 of the target pixel and the color sharpness correcting factor signal $K_C$ from the color correcting factor calculator 12, the color corrector 14 generates sharpness-processed chromaticity signals C1' and C2' of the target pixel based on the values (color edge values) indicated by the chromaticity signals C1 and C2 of the target pixel and the color sharpness correcting factor signal $K_C$. The color corrector 14 outputs the generated chromaticity signals C1' and C2' of the target pixel to the color space inverter 15.

Next, with the luminance signal L' of the target pixel from the luminance corrector 13 and the chromaticity signals C1' and C2' of the target pixel from the color corrector 14, the color space inverter 15 inverts the color space represented by the luminance signal L' and the chromaticity signals C1' and C2' of the target pixel to luminance- and color-corrected RGB signals based on the luminance signal L' and the chromaticity signals C1' and C2' of the target pixel (Step S8).

The color space inverter 15 outputs the inverted RGB signals to the output unit 50 (Step S9).

The color image processing device 30 performs sharpness correction to the color components by using the difference between the saturation of the sharpness processing target pixel and the average saturation of the pixels surrounding the target pixel as well as the difference between the color component of the sharpness processing target pixel and the average color component of the pixels surrounding the target pixel. Accordingly, sharpness correction can be performed to a part having an edge of a color that would not be corrected to a satisfactory extent by only a luminance component.

According to the above-described configuration, natural and excellent sharpness processing can be performed to a color image regardless of the monochrome gray region or the color region included in the image. In addition, natural and effective sharpness processing can be performed even to a part where image enhancement would not take place according to the change in luminance.

When the color of the sharpness processing target pixel is similar to the colors of the surrounding pixels, the color image processing device 30 corrects by using the saturation difference. When the color of the sharpness processing target pixel is different from the colors of the surrounding pixels, the color image processing device 30 performs correction by using both of the hue difference and the saturation difference. Thus, sufficient sharpness correction can be realized even for a part where saturation difference is small.

According to the color image processing device of Embodiment 1, natural and excellent sharpness processing can be performed to image signals.

Embodiment 2

The sharpness processing according to Embodiment 1 is performed based on a color space represented by luminance signals L and chromaticity signals C1 and C2. According to Embodiment 2, sharpness processing is performed based on a color space (e.g., HSV color space, HSL color space, etc.) represented by three attributes, namely, hue, saturation and lightness. Thus, in addition to the advantages of Embodiment 1, the present invention also has the advantages of Embodiment 2 which enables to perform sharpness processing to input image signals.

Hereinafter, a color image processing device according to Embodiment 2 of the invention will be described with reference to FIG. 5.

Figure 5:
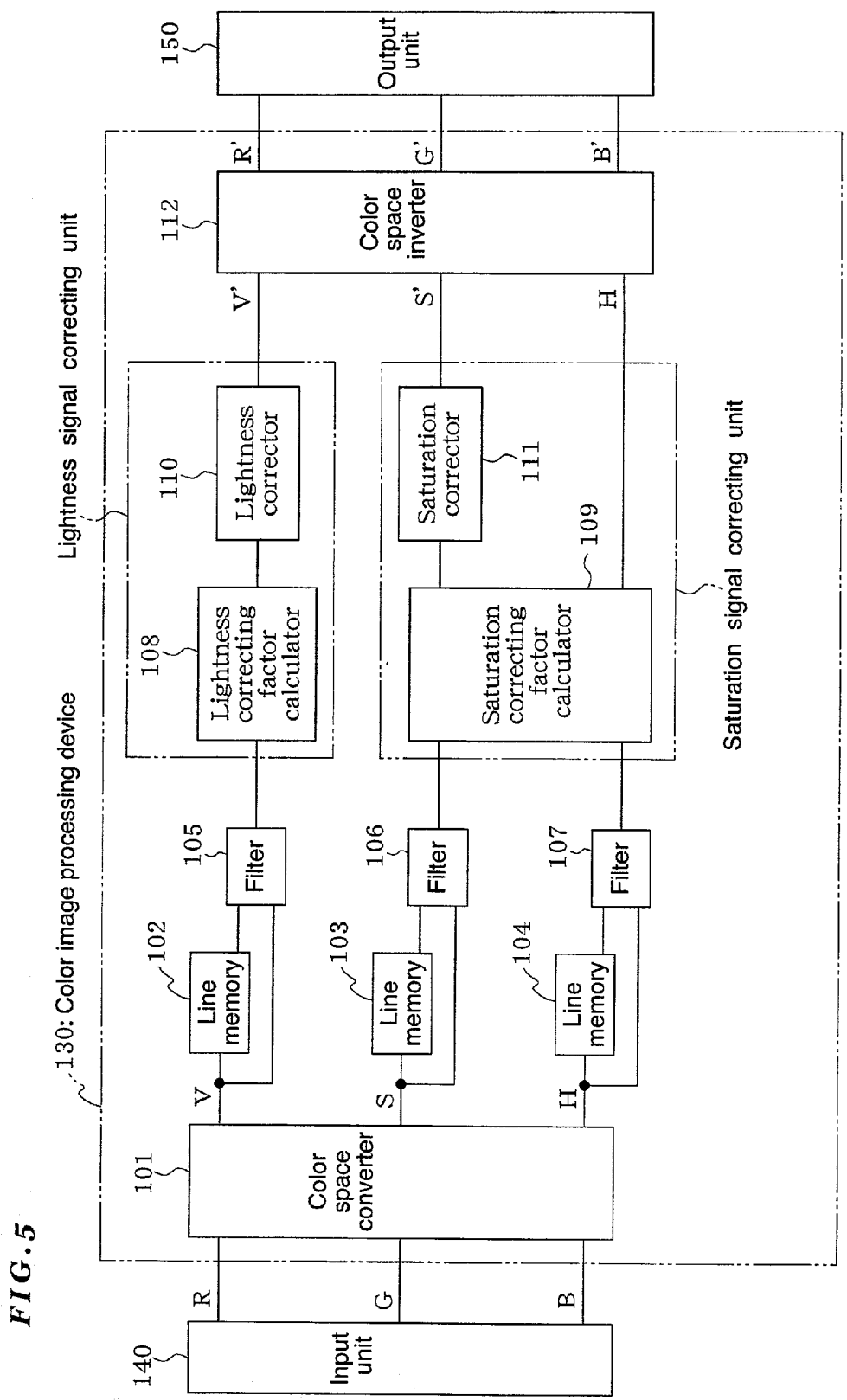
FIG. 5 is a block diagram showing a configuration of a color image processing device according to Embodiment 2 of the invention.

FIG. 5 is a block diagram showing a configuration of the color image processing device of Embodiment 2.

Referring to FIG. 5, the color image processing device 130 according to Embodiment 2 is provided with a color space converter 101, line memories 102 to 104, filters 105 to 107, a lightness correcting factor calculator 108, a saturation correcting factor calculator 109, a lightness corrector 110, a saturation corrector 111 and a color space inverter 112. Furthermore, the color image processing device 130 is connected to peripherals such as an input unit 140 including a scanner and the like, and an output unit 150 including a display unit, a printer and the like.

The input unit 140 scans RGB color image signals (RGB signals) in the x-direction (main scanning direction) and inputs signals on each line by each element of a color space. Here, one line refers to a line of adjacent pixels (including a target pixel) scanned in the main scanning direction. The input unit 140 outputs the input RGB signals for each element of color space to the color space converter 101. Then, the input unit 140 scans in the y-direction (sub-scanning direction) and scans the RGB color image signals (RGB signals) in the main scanning direction to input signals of the next line by each element of the color space. The input RGB signals for each element of the color space are then output to the color space converter 101.

The color space converter 101 converts the RGB signals input from the input unit 140 into a color space represented by lightness signals V representing lightness, saturation signals S representing a degree of vividness of the color and hue signals H representing a tinge of the color. Herein, the lightness signals V, the saturation signals S and the hue signals H are converted using computing or a table. The color space converter 101 outputs the converted lightness signals V to the line memory 102 and the filter 105, the converted saturation signals S to the line memory 103 and the filter 106, and the converted hue signals H to the line memory 104 and the filter 107.

Similar to Embodiment 1, the sizes of the line memories 102 to 104 depend on the sizes of the filters 105 to 107. When a filter has a size for M×M adjacent pixels (where M is an integer), the line memory needs to have a size for at least (M−1) lines. When the line memories each have a size for (M−1) lines, the line memory 102 can store lightness signals V for (M−1) lines given from the color space converter 101, the line memory 103 can store saturation signals S for (M−1) lines given from the color space converter 101, and the line memory 104 can store hue signals H for (M−1) lines given from the color space converter 101.

The filters 105 to 107 read out the signals that are converted into the color space (lightness signals V, saturation signals S and hue signals H) for a line that is (M−1) lines before the present line to the immediately preceding line from the line memories 102 to 104, respectively, and also read out the signals for the present line from the color space converter 101. The filters 105 to 107 use the read-out signals (lightness signals V, saturation signals S and hue signals H) that are converted into the color space to calculate average values of V, S and H based on V, S and H values (edge values) of the target pixel and the pixels surrounding the target pixel.

The filter 105 recognizes a pixel at the center of the M×M (where M is an integer) adjacent pixels as a target pixel. The filter 105 reads out the lightness signals V for the line that is (M−1) lines before the present line to the immediately preceding line from the line memory 102, and reads out the lightness signals V for the present line from the color space converter 101. The filter 105 calculates an average value of the values (lightness edge values) indicated by the lightness signals V of the M×M pixels including the target pixel to generate an average lightness signal $V_A$. The filter 105 outputs the lightness signal V of the target pixel and the calculated average lightness signal $V_A$ to the lightness correcting factor calculator 108.

The filter 106 recognizes a pixel at the center of the M×M (where M is an integer) adjacent pixels as a target pixel. The filter 106 reads out the saturation signals S for the line that is (M−1) lines before the present line to the immediately preceding line from the line memory 103, and reads out the saturation signals S for the present line from the color space converter 101. The filter 106 calculates an average value of the values (saturation edge values) indicated by the saturation signals S of the M×M pixels including the target pixel to generate an average saturation signal $S_A$ The filter 106 outputs the saturation signal S of the target pixel to the lightness correcting factor calculator 108 and the saturation correcting factor calculator 109, and the calculated average saturation signal $S_A$ to the saturation correcting factor calculator 109.

The filter 107 recognizes a pixel at the center of the M×M (where M is an integer) adjacent pixels as a target pixel. The filter 107 reads out the hue signals H for the line that is (M−1) lines before the present line to the immediately preceding line from the line memory 104 and reads out the hue signals H for the present line from the color space converter 101. The filter 107 calculates an average value of the values (hue edge values) indicated by the hue signals H of the M×M pixels including the target pixel to generate an average hue signal $H_A$. The filter 107 outputs the hue signal H of the target pixel and the calculated average hue signal $H_A$ to the saturation correcting factor calculator 109.

The lightness signal V of the target pixel and the average lightness signal $V_A$ from the filter 105, and the saturation signal S of the target pixel from the filter 106 are input to the lightness correcting factor calculator 108. The lightness correcting factor calculator 108 obtains (calculates) a lightness sharpness correcting factor $K_V$ to generate a luminance sharpness correcting factor signal $K_V$ for the lightness corrector 110 to perform sharpness correction, based on the lightness signal V (lightness edge value) of the target pixel and the average lightness signal $V_A$ (mean lightness edge value). Enhancement based on the lightness component is more effective in a monochrome gray region than in a color region. Enhancement in a color region may cause color turbidity or the like, resulting in image deterioration. Accordingly, the lightness sharpness correcting factor is calculated only when the saturation signal S of the sharpness processing target pixel (target pixel) is lower than the lightness correction threshold. The lightness correcting factor calculator 108 calculates the lightness sharpness correcting factor $K_V$ according to the following equation (15) based on the value indicated by the lightness signal V of the target pixel, the value indicated by the average lightness signal $V_A$ and the saturation signal S, where the enhancement level of the lightness of the entire color image is indicated as $K_{AV}$.

$$K_V = K_{AV} \times (V_A) \tag{15}$$

The lightness correcting factor calculator 108 outputs the lightness signal V of the target pixel and the lightness sharpness correcting factor signal $K_V$ (the calculated lightness sharpness correcting factor $K_V$) to the lightness corrector 110.

The lightness signal V of the target pixel and the lightness sharpness correcting factor signal $K_V$ from the lightness correcting factor calculator 108 are input to the lightness corrector 110. In order to perform sharpness correction to the lightness signal V of the target pixel, the lightness corrector 110 obtains (calculates/generates) a sharpness-corrected lightness signal V' of the target pixel based on the value (lightness edge value) indicated by the lightness signal V of the target pixel and the lightness sharpness correcting factor signal $K_V$. The lightness corrector 110 calculates the lightness signal V' according to the following equation (16) based on the value indicated by the lightness signal V of the target pixel and the lightness sharpness correcting factor signal $K_V$.

$$V' = V + K_V \tag{16}$$

The lightness corrector 110 outputs the calculated lightness signal V' of the target pixel to the color space inverter 112.

The saturation signal S of the target pixel and the average saturation signal $S_A$ from the filter 106 as well as the hue signal H of the target pixel and the average hue signal $H_A$ from the filter 107 are input to the saturation correcting factor calculator 109. The saturation correcting factor calculator 109 obtains (calculates) a saturation sharpness correcting factor $K_S$ for the saturation corrector 111 to perform sharpness correction, based on the saturation signal S of the target pixel, the average saturation signal $S_A$, the hue signal H of the target pixel and the means hue signal $H_A$.

Similar to Embodiment 1, when the hue difference $|H-H_A|$ is smaller than the saturation correction threshold (when the colors are similar), the saturation correcting factor calculator 109 calculates a saturation sharpness correcting factor $K_S$ according to the following equation (17) based on the saturation signal S of the target pixel, the average saturation signal $S_A$, the hue signal H of the target pixel and the average hue signal $H_A$, where $K_{AS}$ is an enhancement level for the color components in the entire color image.

$$K_S = 1 + K_{AS} \times (S - S_A) \tag{17}$$

When the hue difference $|H-H_A|$ is greater than the saturation correction threshold (when the colors are different), the saturation correcting factor calculator 109 calculates a saturation sharpness correcting factor $K_S$ according to the following equation (18) (although there are other various calculations) based on the saturation signal S of the target pixel, the average saturation signal $S_A$, the hue signal H of the target pixel and the average hue signal $H_A$' where $K_{AH}$ is an enhancement level for the color components in the entire color image.

$$K_S = 1 + K_{AH} \times (S - S_A) \tag{18}$$

Alternatively, when the colors are different, a table may be produced based on hue difference $|H-H_A|$ and saturation difference $(S-S_A)$ to calculate $K_S$. In either case, the saturation sharpness correcting factor is calculated considering the hue difference and the saturation difference. The saturation correcting factor calculator 109 outputs the saturation sharpness correcting factor signal $K_S$ (the calculated saturation sharpness correcting factor $K_S$) and the saturation signal S of the target pixel to the saturation corrector 111, and the hue signal H of the target pixel to the color space inverter 112.

The saturation signal S of the target pixel and the saturation sharpness correcting factor signal $K_S$ from the saturation correcting factor calculator 109 are input to the saturation corrector 111. In order to perform sharpness correction to the saturation signal S of the target pixel, the saturation corrector 111 obtains (calculates/generates) a sharpness-corrected saturation signal S' of the target pixel, based on the value (saturation edge value) indicated by the saturation signal S of the target pixel and the saturation sharpness correcting factor signal $K_S$. The saturation corrector 111 calculates the saturation signal S' according to the following equation (19) based on the value indicated by the saturation signal S of the target pixel and the saturation sharpness correcting factor-signal $K_S$.

$$S' = S \times K \quad (19)$$

The saturation corrector 111 outputs the calculated saturation signal S' of the target pixel to the color space inverter 112.

The lightness signal V' of the target pixel from the lightness corrector 110, the saturation signal S' of the target pixel from the saturation corrector 111 and the hue signal H of the target pixel from the saturation correcting factor calculator 109 are input to the color space inverter 112. The color space inverter 112 inverts the color space represented by the input lightness signal V', the input saturation signal S' and the input hue signal H of the target pixel to lightness- and saturation-corrected RGB (R'G'B') signals based on the lightness signal V', the saturation signal S' and the hue signal H of the target pixel. The color space inverter 112 outputs the inverted RGB (R'G'B') signals to the output unit 150.

The output unit 150 displays or prints out the converted RGB (R'G'B') signals.

Accordingly, the color image processing device 130 is capable of performing natural and excellent sharpness processing to image signals regardless of a monochrome gray region or a color region in the color image. The color image processing device 130 can perform sharpness processing to a color space represented by the three attributes, namely, hue, saturation and lightness to cope with difference of any of lightness, saturation and hue components of pixels.

Hereinafter, operations performed by the above-described color image processing device 130 will be described with reference to FIG. 6.

Figure 6:
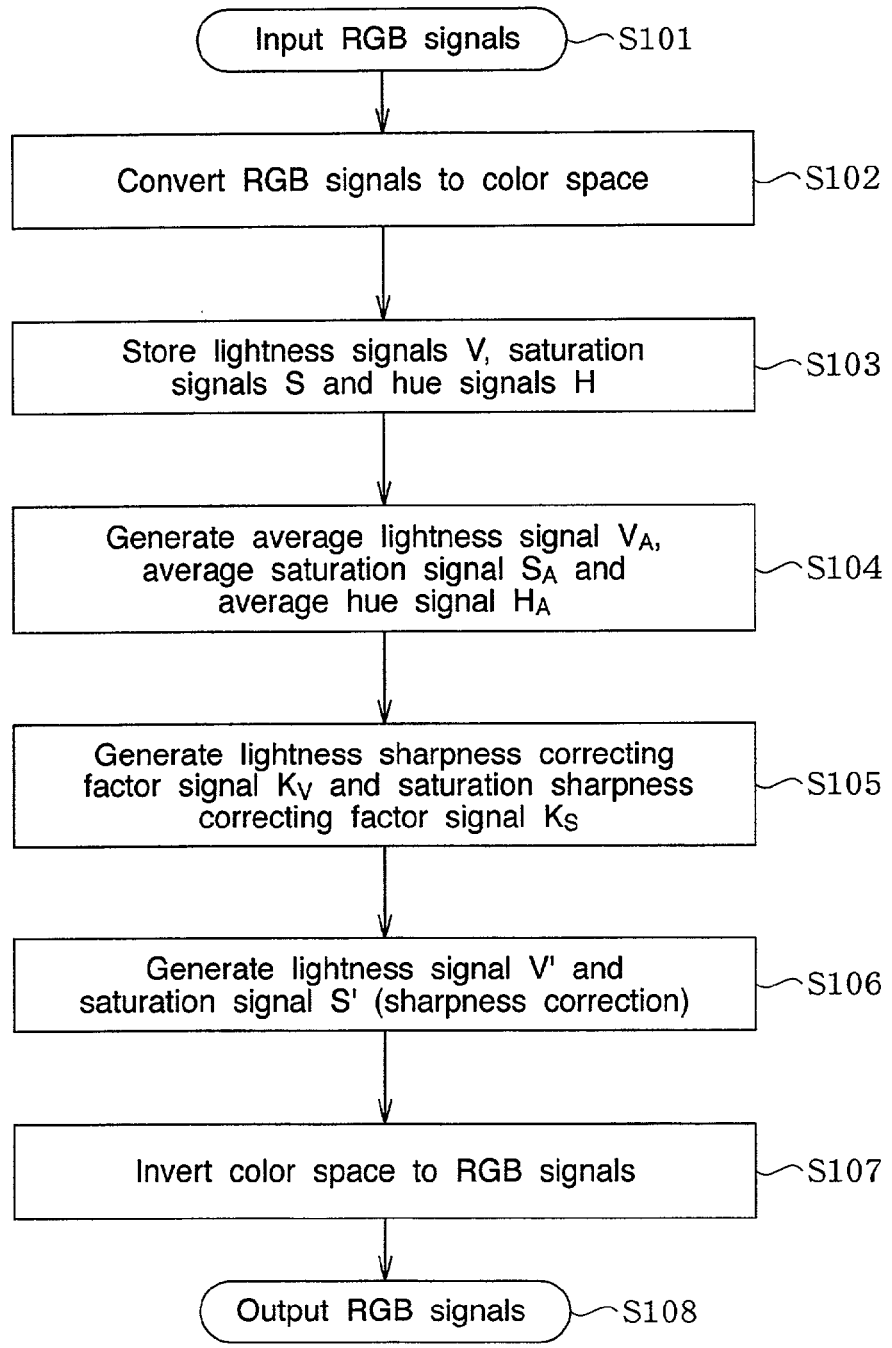
FIG. 6 is a flowchart showing a series of operations performed by the color image processing device of Embodiment 2.

FIG. 6 is a flowchart showing a series of operations performed by the color image processing device 130 according to Embodiment 2.

Referring to FIG. 6, RGB signals are input from the input unit 140 to the color space converter 101 (Step S101).

The color space converter 101 converts the input RGB signals from the input unit 140 into a-color space represented by lightness signals V, saturation signals S and hue signals H (Step S102). The color space converter 101 outputs the converted lightness signals V to the line memory 102 and the filter 105, the converted saturation signals S to the line memory 103 and the filter 106, and the converted hue signals H to the line memory 104 and the filter 107.

The line memories 102 to 104 store the lightness signals V, the saturation signals S and the hue signals H from the color space converter 101, respectively (Step S103).

Next, for M×M (where M is an integer) adjacent pixels with a target pixel at the center, the filter 105 reads out the lightness signals V for the line that is (M−1) lines before the present line to the immediately preceding line from the line memory 102 as well as the lightness signals V for the present line from the color space converter 101, thereby generating an average lightness signal $V_A$ based on the values (lightness edge values) indicated by the lightness signals V of the M×M pixels including the target pixel (Step S104). The filter 105 outputs the lightness signal V of the target pixel and the generated average lightness signal $V_A$ to the lightness correcting factor calculator 108.

In Step S104, for M×M (where M is an integer) adjacent pixels with a target pixel at the center, the filter 106 reads out the saturation signals S for the line that is (M−1) lines before the present line to the immediately preceding line from the line memory 103 as well as the saturation signals S for the present line from the color space converter 101, thereby generating an average saturation signal $S_A$ from the values (saturation edge values) indicated by the saturation signals S of the M×M pixels including the target pixel. The filter 106 outputs the saturation signal S of the target pixel to the lightness correcting factor calculator 108 and the saturation correcting factor calculator 109, and the generated average saturation signal $S_A$ to the saturation correcting factor calculator 109.

In Step S104, for M×M (where M is an integer) adjacent pixels with a target pixel at the center, the filter 107 reads out the hue signals H for the line that is (M−1) lines before the present line to the immediately preceding line from the line memory 104 as well as the hue signals H for the present line from the color space converter 101, thereby generating an average hue signal $H_A$ from the values (hue edge values) indicated by the hue signals H of the M×M pixels including the target pixel. The filter 107 outputs the hue signal H of the target pixel and the generated average hue signal $H_A$ to the saturation correcting factor calculator 109.

Next, with the lightness signal V of the target pixel and the average lightness signal $V_A$ from the filter 105 as well as the saturation signal S of the target pixel from the filter 106, the lightness correcting factor calculator 108 generates a lightness sharpness correcting factor signal $K_V$ based on values (lightness edge value and average lightness edge value) indicated by the lightness signal V of the target pixel and the average lightness signal $V_A$ (Step S105). The lightness correcting factor calculator 108 outputs the lightness signal V of the target pixel and the generated lightness sharpness correcting factor signal $K_V$ to the lightness corrector 110.

In Step S105, with the saturation signal S of the target pixel and the average saturation signal $S_A$ from the filter 106 as well as the hue signal of the target pixel and the average hue signal $H_A$ from the filter 107, the saturation correcting factor calculator 109 generates a saturation sharpness correcting factor signal $K_S$ based on the saturation signal S of the target pixel, the average saturation signal $S_A$, the hue signal H of the target pixel and the average hue signal $H_A$. The saturation correcting factor calculator 109 outputs the generated saturation sharpness correcting factor signal $K_S$ and the saturation signal S of the target pixel to the saturation corrector 111 and the hue signal H of the target pixel to the color space inverter 112.

Next, in order to perform sharpness correction to the lightness signal V of the target pixel, with the lightness signal V of the target pixel and the lightness sharpness correcting factor signal $K_V$ from the lightness correcting factor calculator 108, the lightness corrector 110 generates a sharpness-processed lightness signal V' of the target pixel based on the a value (lightness edge value) indicated by the lightness signal V of the target pixel and the lightness sharpness correcting factor signal $K_V$ (Step S106). The lightness corrector 110 outputs the generated lightness signal V' of the target pixel to the color space inverter 112.

In Step S106, in order to perform sharpness correction to the saturation signal S of the target pixel, with the saturation signal S of the target pixel and the saturation sharpness correcting factor signal $K_S$ from the saturation correcting factor calculator 109, the saturation corrector 111 generates a sharpness-processed saturation signal S' of the target pixel based on the value (saturation edge value) indicated by the saturation signal S of the target pixel and the saturation sharpness correcting factor signal $K_S$. The saturation corrector 111 outputs the generated saturation signal S' of the target pixel to the color space inverter 112.

Next, with the lightness signal V' of the target pixel from the lightness corrector 110, the saturation signal S' of the target pixel from the saturation corrector 111 and the hue signal H of the target pixel from the saturation correcting factor calculator 109, the color space inverter 112 inverts the color space represented by the lightness signal V', the saturation signal S' and the hue signal H of the target pixel to lightness- and saturation-corrected RGB (R'G'B') signals based on the lightness signal V', the saturation signal S' and the hue signal H of the target pixel (Step S107).

The color space inverter 112 outputs the inverted RGB (R'G'B) signals to the output unit 150 (Step S108).

Accordingly, the color image processing device 130 can perform natural and excellent sharpness processing to image signals. The color image processing device 130 can perform natural and excellent sharpness processing to a color image regardless of a monochrome gray region or a color region in a color image. In addition, natural and effective sharpness processing can be performed even to a part where image enhancement would not take place according to difference of lightness. Since the color image processing device 130 can perform sharpness processing according to the color space represented by the three attributes, namely, hue, saturation and lightness, it can sufficiently cope with difference of any of lightness, saturation and hue components.

Thus, in addition to the advantage of Embodiment 1, the color image processing device of Embodiment 2 can sufficiently cope with difference of any of lightness, saturation and hue components.

The color image processing device of the invention can perform natural and excellent sharpness processing to image data.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and rage of equivalency of the claims are therefore intended to be embraced therein.

The entire disclosure of Japanese Patent Application No. 2001-044143 (Filed on Feb. 20, 2001) including specification, claims, drawings and summary are incorporated herein by reference in its entirety.

What is to be claimed:

1. A color image processing device comprising:
a color space converter for converting image signals to luminance signals corresponding to luminance and first and second chromaticity signals corresponding to chromaticity;
a luminance signal correcting unit for correcting the luminance signal of a target pixel based on an average luminance signal obtained from luminance signals of the target pixel and predetermined pixels surrounding the target pixel in an x-y plane where x is in a main scanning direction and y is in a sub-scanning direction, and a saturation signal corresponding to saturation of the target pixel;
a chromaticity signal correcting unit for correcting
the first and second chromaticity signals of the target pixel based on first and second average chromaticity signals obtained from the chromaticity signals of the target pixel and the predetermined pixels surrounding the target pixel,
the saturation signal of the target pixel, an average saturation signal of the target pixel and the predetermined pixels surrounding the target pixel, and
a hue difference signal representing color similarity which is obtained from the first and second chromaticity signals and the first and second average chromaticity signals;
a color space inverter for inverting the corrected luminance signal, the corrected first chromaticity signal and the corrected second chromaticity signal to image signals; and
a saturation calculator for generating a saturation signal of the target pixel based on the first and second chromaticity signals;
an average saturation calculator for generating the average saturation signal based on the first and second average chromaticity signals; and
a hue difference calculator for generating the hue difference signal based on the first and second chromaticity signals as well as the first and second average chromaticity signals;
wherein the chromaticity signal correcting unit comprises a color correcting factor calculator for determining the chromaticity correcting level for correcting the first and second chromaticity signals of the target pixel based on the saturation signal of the target pixel, the average saturation signal and the hue difference signal; and
wherein the color correcting factor calculator determines the chromaticity correcting level according to a first equation, when the hue difference signal is smaller than a hue difference threshold and determines the chromaticity correcting level according to a second equation, different from the first equation, when the hue difference signal is greater than the hue difference threshold.

2. A color image processing device according to claim 1, wherein the luminance signal correcting unit comprises a luminance correcting factor calculator for determining a luminance correcting level for correcting the luminance signal of the target pixel based on the average luminance signal and the saturation signal of the target pixel.

3. A color image processing device according to claim 2, wherein the luminance signal correcting unit comprises a luminance corrector for correcting the luminance signal of the target pixel based on the luminance correcting level.

4. A color image processing device according to claim 1, wherein the chromaticity signal correcting unit comprises a chromaticity corrector for correcting the first and second chromaticity signals based on the chromaticity correcting level.

5. The color image processing device according to claim 1, wherein the luminance signal correcting unit only corrects the luminance signal when the saturation signal of the target pixel is lower than a luminance correction threshold.

6. A color image processing method comprising the steps of:
   (a) converting image signals to luminance signals corresponding to luminance, and first and second chromaticity signals corresponding to chromaticity;
   (b) correcting the luminance signal of a target pixel based on an average luminance signal obtained from the luminance signals of the target pixel and predetermined pixels surrounding the target pixel in an x-y plane where x is in a main scanning direction and y is in a sub-scanning direction, and a saturation signal corresponding to saturation of the target pixel;
   (c) correcting
       the first and second chromaticity signals of the target pixel based on first and second average chromaticity signals obtained from the chromaticity signals of the target pixel and the predetermined pixels surrounding the target pixel,
       the saturation signal of the target pixel, the average saturation signal, and
       a hue difference signal representing color similarity obtained from the first and second chromaticity signals and the first and second average chromaticity signals; and
   (d) inverting the corrected luminance signal, the corrected first chromaticity signal and the corrected second chromaticity signal to image signals
   (e) generating the saturation signal of the target pixel based on the first and second chromaticity signals;
   (f) generating the average saturation signal based on the first and second average chromaticity signals; and
   (g) generating the hue difference signal based on the first and second chromaticity signals as well as first and second average chromaticity signals;
   wherein the step of (c) for correcting the chromaticity signals further comprises the step of:
       (c1) determining a chromaticity correcting level for correcting the first and second chromaticity signals of the target pixel based on the saturation signal of the target pixel, the average saturation signal and the hue difference signal according to a first equation when the hue difference signal is smaller than a hue difference threshold and according to a second equation, different from the first equation, when the hue difference signal is greater than the hue difference threshold.

7. A color image processing method according to claim 6, wherein the step of (b) for correcting the luminance signal further comprises the steps of:
   (b1) determining the luminance correcting level for correcting the luminance signal of the target pixel based on the average luminance signal and the saturation signal of the target pixel; and
   (b2) correcting the luminance signal based on the luminance correcting level.

8. A color image processing method according to claim 6, wherein the step of (c) for correcting the chromaticity signals further comprises the step of:
   (c2) correcting the first and second chromaticity signals of the target pixel based on the chromaticity correcting level.

* * * * *